United States Patent
Alliger et al.

(10) Patent No.: US 10,087,268 B2
(45) Date of Patent: Oct. 2, 2018

(54) CATALYSTS FOR THE FORMATION OF MULTIMODAL POLYMERS

(71) Applicant: ExxonMobil Chemical Patents Inc., Baytown, TX (US)

(72) Inventors: Glen E. Alliger, Houston, TX (US); Laughlin G. McCullough, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 86 days.

(21) Appl. No.: 15/252,684

(22) Filed: Aug. 31, 2016

(65) Prior Publication Data

US 2017/0114168 A1 Apr. 27, 2017

Related U.S. Application Data

(60) Provisional application No. 62/245,085, filed on Oct. 22, 2015.

(30) Foreign Application Priority Data

Dec. 18, 2015 (EP) .................................... 15201304

(51) Int. Cl.
*C08F 210/16* (2006.01)
*C08F 4/639* (2006.01)
*C08F 4/6392* (2006.01)
*C08F 4/6592* (2006.01)

(52) U.S. Cl.
CPC .......... *C08F 210/16* (2013.01); *C08F 4/6392* (2013.01); *C08F 4/63912* (2013.01); *C08F 4/63916* (2013.01); *C08F 4/65927* (2013.01); *C08F 2420/01* (2013.01)

(58) Field of Classification Search
CPC .................... C08F 4/63904; C08F 4/63916; C08F 4/6392; C08F 4/63927; C08F 210/16
See application file for complete search history.

(56) References Cited

U.S. PATENT DOCUMENTS

| | | | |
|---|---|---|---|
| 5,817,725 | A | 10/1998 | Zandona |
| 2005/0054799 | A1* | 3/2005 | Kuo ..................... C08F 10/00 526/348.1 |
| 2010/0267901 | A1 | 10/2010 | Fantinel et al. |
| 2012/0059134 | A1 | 3/2012 | Yang et al. |
| 2013/0225820 | A1 | 8/2013 | Ding et al. |

FOREIGN PATENT DOCUMENTS

| | | |
|---|---|---|
| CN | 102070732 | 5/2011 |
| WO | WO2006/052232 | 5/2006 |
| WO | WO2008/140875 | 11/2008 |
| WO | WO2011/089017 | 7/2011 |
| WO | WO2012/040147 | 3/2012 |
| WO | WO2012/067777 | 5/2012 |
| WO | WO2014/099303 | 6/2014 |
| WO | WO2014/099307 | 6/2014 |
| WO | WO2015/191290 | 12/2015 |

OTHER PUBLICATIONS

Anonymous: "Non-Crosslinked HDPE for Hot-Water Pressure Pipe: Plastics Technology" Plastics Technology, May 1, 2009.
Chen, et al., "*Rheological, Thermal, and Morphological Properties of Low-Density Polyethylene/Ultra-High-Molecular-Weight Polyethylene and Linear Low-Density Polyethylene/Ultra-High Molecular-Weight Polyethylene Blends*", Journal of Applied Polymer Science, 2013; pp. 945-953.
Kurek et al., "*Mesoporous Silica Supported Multiple Single-Site Catalysts and Polyethylene Reactor Blends with Tailor-Made Trimodal and Ultra-Broad Molecular Weight Distributions*", Macromolecular Rapid Communications, Macromolecular Journals, 2010, 3, pp. 1359-1363.
Dohring et al., "*Donor-Ligand-Substituted Cyclopentadienylchromium (III) Complexes: A New Class of Alkene Polymerization Catalyst 1. Amino-Substituted Systems*", S. Organometallics, 2000, 19, pp. 388-402.

* cited by examiner

*Primary Examiner* — Edward J Cain
(74) *Attorney, Agent, or Firm* — Leandro Arechederra, III

(57) ABSTRACT

Disclosed are methods for polymerizing olefin monomers comprising contacting one or more olefin monomers with a cosupported catalyst system and an activator. Also disclosed are polymers produced using the catalyst systems and methods disclosed herein. The polymers have a multimodal molecular weight distribution and may be produced in a single reactor.

21 Claims, 2 Drawing Sheets

CATALYSTS FOR THE FORMATION OF MULTIMODAL POLYMERS

CROSS REFERENCE TO RELATED APPLICATIONS

This application claims the benefit of Ser. No. 62/245,085, filed Oct. 22, 2015, and EP 15201304.1, filed Dec. 18, 2015, the disclosures of which are hereby incorporated by reference in their entireties.

FIELD OF THE INVENTION

This invention relates to cosupported catalyst systems comprising a bridged metallocene catalyst and a second catalyst, and their use to polymerize olefins, particularly ethylene. This invention also relates to olefin polymers produced with such catalyst systems.

BACKGROUND OF THE INVENTION

Polyethylenes with a multimodal molecular weight distribution ("MWD") are of interest because they can combine the processability attributes of low molecular weight polymers with the mechanical properties of high molecular weight polymers. It is thought that adding an ultra-high molecular weight polyethylene ("UHMWPE") component to polyethylene resins of lower molecular weight may improve the properties of that resin and retain the processing properties normally associated with lower molecular weight polyethylene. However, simple blending of a UHMWPE and a linear low density polyethylene may result in both melt and solid phase separation (See Chen, Y.; Zou, H.; Liang, M.; Liu, P. J. App. Polym. Sci. 2013, 129, 945-953.)

The ability to produce a UHMWPE in the same reactor as a lower molecular weight material could provide a cost-effective way of producing a multimodal resin with the different molecular weight components already intimately mixed. To enable this, it would be advantageous if a catalyst capable of producing UHMWPE could be cosupported with a metallocene catalyst such that the two catalysts did not interfere with one another. However, cosupportation of catalysts is complex and it is difficult to select catalyst combinations that are both compatible (i.e., do not interfere with each others' ability to produce polymer) and produce the desired product.

Even when cosupportation is successful, it typically leads to polymers with a MWD having a number of modes equal to the number of catalysts supported. Thus, to produce a polymer with a trimodal MWD, one would theoretically need to find three catalysts that are compatible and can be successfully activated on the same support. The ability to reduce the number of catalysts on the support and still maintain the n-modal capability of the cosupported catalyst system (n>2) would simplify the catalyst system and preparation processes and decrease the possibility of the catalysts interfering with each other.

Half sandwich chromocenes are disclosed in DE 19710615, WO 2012/040147, US 2013/0225820, US 2010/0267901, and CN 102070732. In particular, *J. Organometallics* 2000, 19, 388-402 (Dohring, et al.) discloses ethylene (cyclopentadienyl) (pyrrolidine)chromium dichloride.

Further, WO 2006/052232 discloses a catalyst comprising a chromocene and bis(n-butyl cyclopentadienyl)zirconium dichloride to produce broad Mw/Mn, high molecular weight polyethylene.

WO 2011/089017 discloses the preparation of high molecular weight polyethylene using a catalyst of a half sandwich indenyl chromocene and a hafnocene.

WO 2008/140875 discloses a combination of metallocene with chromium catalyst on the same support.

Other references of interest include: US 2012/0059134, WO 2012/067777, WO 2014/099307, WO 2015/191290, and *Macromol. Rapid Comm.*, 2010, 31, 1359-1363 (Kurek, et al.).

There is still a need for new and improved catalyst systems for the polymerization of olefins to achieve specific polymer properties, such as multi-modality, without comprising polymer processability. There is also a need for polymer catalyst systems having n-modal capability (n>2) that are simple and cost effective to prepare and use in polymerization processes.

SUMMARY OF THE INVENTION

This invention relates to cosupported catalyst systems comprising a bridged metallocene catalyst represented by Formula I and a second catalyst represented by Formula II, wherein Formula I is:

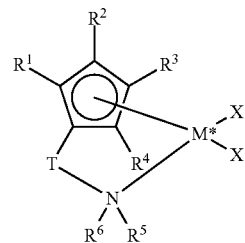

where T is a bridging group; N is nitrogen; M* is Cr, Mo, or W, where M* is in a +3 oxidation state prior to contacting with activator; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, including that two X's may form a part of a fused ring or a ring system; each $R^1$, $R^2$, $R^3$, and $R^4$ is, independently, hydrogen, a $C_1$ to $C_{12}$ hydrocarbyl, a substituted $C_1$ to $C_{12}$ hydrocarbyl, a heteroatom, or substituted heteroatom group; and each $R^5$ and $R^6$ is, independently, a $C_1$ to $C_{12}$ hydrocarbyl, a substituted $C_1$ to $C_{12}$ hydrocarbyl, a heteroatom, or substituted heteroatom group, where the $R^5$ and $R^6$ groups may form a fused ring or multicenter fused ring system where the rings may be aromatic, partially saturated or saturated; and Formula II is:

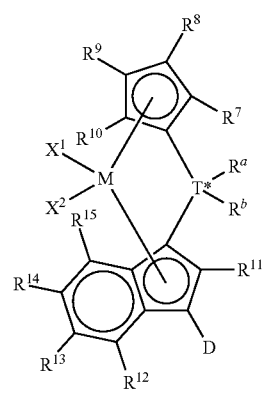

where M is a group 4 metal; T* is a group 14 atom; D is a substituted or unsubstituted aromatic group; $R^a$ and $R^b$ are, independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system; each $X^1$ and $X^2$ is, independently, selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; each of $R^{11}$, $R^{12}$, $R^{13}$, $R^{14}$, and $R^{15}$ is, independently, hydrogen, halide, alkoxide or a $C_1$ to $C_{40}$ substituted or unsubstituted hydrocarbyl group, and any of adjacent $R^{12}$, $R^{13}$, $R^{14}$, and/or $R^{15}$ groups may form a fused ring or multicenter fused ring systems, where the rings may be substituted or unsubstituted, and may be aromatic, partially unsaturated, or unsaturated; and each of $R^7$, $R^8$, $R^9$, and $R^{10}$ is, independently, hydrogen or a $C_1$ to $C_{40}$ substituted or unsubstituted hydrocarbyl group; and further provided that at least two of $R^7$, $R^8$, $R^9$, and $R^{10}$ are $C_1$ to $C_{40}$ substituted or unsubstituted hydrocarbyl groups.

This invention also relates to methods for polymerizing olefin monomers comprising contacting one or more olefin monomers with a cosupported catalyst system and an activator. This invention further relates to polymers produced using the catalysts and methods described herein. The polymers produced have a multimodal molecular weight distribution, such as a trimodal molecular weight distribution, and may be produced in a single reactor.

This invention also relates to a catalyst system capable of making an olefin polymer with a trimodal molecular weight distribution, wherein the catalyst system comprises no more than two olefin polymerization catalysts.

DETAILED DESCRIPTION OF THE INVENTION

Figure 1:
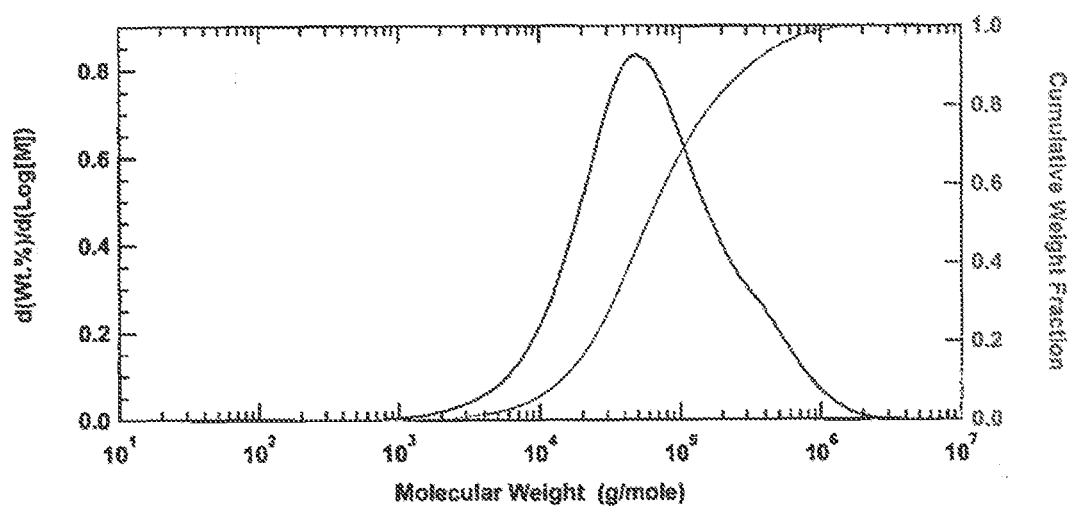
FIG. 1 is a GPC trace for a polyethylene polymer obtained using a catalyst system comprising only one catalyst compound, dimethylsilylene(3-phenyl-1-indenyl)(2,3,4,5-tetramethyl-1-cyclopentadienyl)zirconium dichloride.

It is thought that adding an UHMWPE component to polyethylene resins of lower molecular weight may improve the properties of that resin and retain the processing properties normally associated with lower molecular weight polyethylene. However, such blends are difficult to make in post-reactor processes as they may suffer from both melt and solid phase separation. The ability to produce an UHMWPE in the same reactor as a lower molecular weight material could provide a relatively simple and cost-effective way of making multimodal resins with the two molecular weight components already intimately mixed. To enable this, it would be advantageous if a catalyst capable of producing UHMWPE could be cosupported with a metallocene catalyst such that the two catalysts did not interfere with one another.

The present invention is directed to such cosupported catalyst systems comprising a bridged metallocene catalyst and a second catalyst, and their use to polymerize olefins, particularly ethylene. The cosupported catalyst systems of the present invention may have n-modal capability, where n is >2. Thus, they are capable of making multimodal polymers, including trimodal polymers, that incorporate an UHMWPE component. The multimodal polymers may be produced in a single reactor, such as a single high pressure, solution phase, gas phase, or other reactor. In preferred embodiments of the invention, the cosupported catalyst system includes only two metallocene catalyst compounds, but a polymer with a trimodal MWD is obtained.

Definitions

For the purposes of this invention and the claims thereto, the new numbering scheme for the Periodic Table Groups is used as described in Chemical and Engineering News, 63(5), pg. 27 (1985).

A metallocene catalyst compound is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

As used herein, Mn is number average molecular weight, Mw is weight average molecular weight, and Mz is z average molecular weight, wt % is weight percent, and mole % is mole percent. Molecular weight distribution (MWD), also referred to as polydispersity, is defined to be Mw divided by Mn. Unless otherwise noted, all molecular weight units (e.g., Mw, Mn, and Mz) are g/mol.

Catalyst System

This invention relates to cosupported catalyst systems comprising a bridged metallocene catalyst represented by Formula I and a second catalyst represented by Formula II, wherein Formula I is:

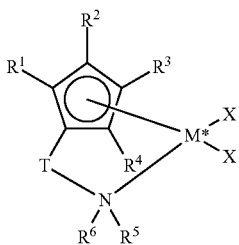

where T is a bridging group; N is nitrogen; M* is Cr, Mo, or W, where M* is in a +3 oxidation state prior to contacting with activator; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, including that two X's may form a part of a fused ring or a ring system; each $R^1$, $R^2$, $R^3$, and $R^4$ is, independently, hydrogen, a $C_1$ to $C_{12}$ hydrocarbyl, a substituted $C_1$ to $C_{12}$ hydrocarbyl, a heteroatom, or substituted heteroatom group; and each $R^5$ and $R^6$ is, independently, a $C_1$ to $C_{12}$ hydrocarbyl, a substituted $C_1$ to $C_{12}$ hydrocarbyl, a heteroatom, or substituted heteroatom group, where the $R^5$ and $R^6$ groups may form a fused ring or multicenter fused ring system where the rings may be aromatic, partially saturated or saturated.

In Formula I, each $R^1$, $R^2$, $R^3$, and $R^4$ may be, independently, hydrogen, methyl, ethyl, propyl, butyl, pentyl, hexyl, heptyl, octyl, nonyl, decyl, undecyl, docecyl, or an isomer thereof, Cl, Br, F, I, or Si, preferably methyl, ethyl, propyl, butyl or an isomer thereof.

In Formula I, each $R^5$ and $R^6$ may be, independently, methyl, ethyl, propyl, butyl, pentyl, hexyl, heptyl, octyl, nonyl, decyl, undecyl, docecyl, or an isomer thereof, Cl, Br, F, I, or Si. In Formula I, the $R^5$ and $R^6$ groups may form a 3 to 24 membered fused ring with the nitrogen atom, where the rings may be aromatic, partially saturated or saturated, preferably saturated. The ring(s) may have 3 to 20 members, alternately 4 to 18, alternately 5 to 15, alternately 6 to 12. Useful $N(R^5)(R^6)$ fragments include: pyrrolidine, aziridine, azetidine, piperidine, azepane, azocane, azonane, 1H-azirine, 1,2-dihydroazete, 2-pyrroline, 3-pyrroline, 1,4-dihydropyridine, azepine, azonine, indole, isoindole, indoline, isoindoline, or substituted versions thereof, where the substituents are alkyl, aryl, silyl, and or halide groups. Useful $N(R^5)(R^6)$ fragments are neutral donor ligands. A neutral donor ligand is defined as one that, in its uncoordinated state, bears a formal charge of zero. Useful $N(R^5)(R^6)$ fragments are not anionic or cationic ligands.

In Formula I, T may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$ where each R is, independently, hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R may join to form a substituted or unsubstituted, saturated, partially unsaturated or aromatic, cyclic or polycyclic substituent. Preferably, T may be a bridging group comprising carbon or silica, such as dialkylsilyl, preferably T is selected from $CH_2$, $CH_2CH_2$, $C(CH_3)_2$, $SiMe_2$, $SiPh_2$, $SiMePh$, silylcyclobutyl $(Si(CH_2)_3)$, $(Ph)_2C$, $(p-(Et)_3SiPh)_2C$, and cyclopentasilylene $(Si(CH_2)_4)$.

In Formula I, T may be represented by the formula $R_2^xJ$, where J is C, Si, or Ge, and each $R^x$ is, independently, hydrogen, halogen, $C_1$ to $C_{20}$ hydrocarbyl or a $C_1$ to $C_{20}$ substituted hydrocarbyl, and two $R^x$ can form a cyclic structure including aromatic, partially saturated, or saturated cyclic or fused ring system.

In Formula I, T may be represented by the formula, $(R*_2G)_g$, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl, and two or more R* can form a cyclic structure including aromatic, partially saturated, or saturated cyclic or fused ring system, preferably T is $CH_2$, $CH_2CH_2$, $C(CH_3)_2$, $SiMe_2$, $SiPh_2$, $SiMePh$, $Si(CH_2)_3$, $Si(CH_2)_4$, $Si(CH_2)_5$, or $CPh_2$.

Catalyst compounds represented by Formula I that are particularly useful in this invention include one or more of: ethylene (cyclopentadienyl)(pyrrolidine)chromium dimethyl; dimethylsilyl (cyclopentadienyl)(pyrrolidine)chromium dimethyl; phenylene (cyclopentadienyl)(pyrrolidine) chromium dimethyl; and diphenylsilyl (cyclopentadienyl) (pyrrolidine)chromium dimethyl.

Formula II is:

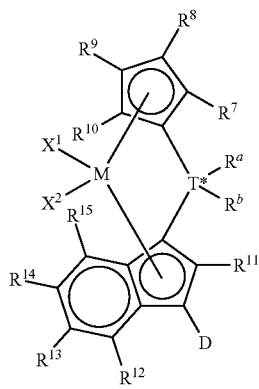

where M is a group 4 metal, such as zirconium or hafnium, preferably zirconium;

T* is a group 14 atom, such as silicon or germanium, preferably silicon;

D is a substituted or unsubstituted aromatic group (preferably, D is selected from the group consisting of substituted or unsubstituted phenyl, naphthyl, biphenyl, cyclopropenyl, tropylium, cyclooctatetraenyl, furanyl, pyridinyl, borabenzyl, thiophenyl, azolyl, oxazolyl, and imidazolyl; more preferably, D is selected from the group consisting of substituted or unsubstituted phenyl, biphenyl, naphthyl, cyclopropenyl, furanyl, pyridinyl, thiophenyl, azolyl, oxazolyl, and imidazolyl, where "substituted or unsubstituted" refers to all members of the group listed);

$R^a$ and $R^b$ are, independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system (preferably, each $R^a$ and $R^b$ is, independently, selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T* being the heteroatom; more preferably, each $R^a$ and $R^b$ is, independently, selected from the group consisting of chlorides, fluorides, methyl, and ethyl groups);

each $X^1$ and $X^2$ is, independently, selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; each of $R^{11}$, $R^{12}$, $R^{13}$, $R^{14}$, and $R^{15}$ is, independently, hydrogen, halide, alkoxide or a $C_1$ to $C_{40}$ substituted or unsubstituted hydrocarbyl group, and any of adjacent $R^{12}$, $R^{13}$, $R^{14}$, and/or $R^{15}$ groups may form a fused ring or multicenter fused ring systems, where the rings may be substituted or unsubstituted, and may be aromatic, partially unsaturated, or unsaturated (preferably, each of $R^{11}$, $R^{12}$, $R^{13}$, $R^{14}$, and $R^{15}$ is, independently, a $C_1$ to $C_{20}$ substituted or unsubstituted hydrocarbyl group); and each of $R^7$, $R^8$, $R^9$, and $R^{10}$ is, independently, hydrogen or a $C_1$ to $C_{40}$ substituted or unsubstituted hydrocarbyl group (preferably, each of $R^7$, $R^8$, $R^9$, and $R^{10}$ is, independently, a $C_1$ to $C_{40}$ substituted or unsubstituted hydrocarbyl group; more preferably, each of $R^7$, $R^8$, $R^9$, and $R^{10}$ is, independently, a $C_1$ to $C_{20}$ substituted or unsubstituted hydrocarbyl group; more preferably, each of $R^7$, $R^8$, $R^9$, and $R^{10}$ is, independently, selected from the group consisting of methyl, ethyl, propyl, isopropyl, n-butyl, sec-butyl, t-butyl, pentyl, hexyl, heptyl, octyl, decyl, and undecyl groups; even more preferably, each of $R^7$, $R^8$, $R^9$, and $R^{10}$ is, independently, selected from the group consisting of methyl, ethyl, and n-propyl groups; preferably adjacent $R^7$, $R^8$, $R^9$, and/or $R^{10}$ groups fuse together with the cyclopentadienyl group to form a substituted or unsubstituted fluorene); and further provided that at least two of $R^7$, $R^8$, $R^9$, and $R^{10}$ are $C_1$ to $C_{40}$ substituted or unsubstituted hydrocarbyl groups.

The metallocene compound of Formula II may be asymmetric, which is defined to mean that the groups that are bridged by the T*$R^a R^b$ bridge do not have the same number of fused aromatic rings, for example, the metallocene compound is not a bis-indenyl compound. Instead, the metallocene compound may be a cyclopentadienyl-indenyl compound, a cyclopentadienyl-fluorenyl compound, or a indenyl-fluorenyl compound, etc.

Examples of preferred metallocene compounds include:
dimethylsilylene(3-phenyl-1-indenyl)(2,3,4,5-tetramethyl-1-cyclopentadienyl)zirconium dichloride;
dimethylsilylene(3-phenyl-1-indenyl)(2,5-dimethyl-1-cyclopentadienyl)zirconium dichloride;
dimethylsilylene(3-phenyl-1-indenyl)(3,4-dimethyl-1-cyclopentadienyl)zirconium dichloride;
dimethylsilylene(3-phenyl-1-indenyl)(2,3,4,5-tetraethyl-1-cyclopentadienyl)zirconium dichloride;
dimethylsilylene(3-phenyl-1-indenyl)(2,3,4,5-tetrapropyl-1-cyclopentadienyl)zirconium dichloride;
dimethylsilylene(3-phenyl-1-indenyl)(9-fluorenyl)zirconium dichloride;
dimethylsilylene(3-phenyl-1-indenyl)(2,7-dimethyl-9-fluorenyl)zirconium dichloride;
dimethylsilylene(3-phenyl-1-indenyl)(2,7-di-t-butyl-9-fluorenyl)zirconium dichloride;
dimethylsilylene(3-phenyl-1-indenyl)(3,6-dimethyl-9-fluorenyl)zirconium dichloride;
dimethylsilylene(3-phenyl-1-indenyl)(3,6-di-t-butyl-9-fluorenyl)zirconium dichloride;
dimethylsilylene(3-phenyl-1-indenyl)(4,7-dimethyl-9-fluorenyl)zirconium dichloride;
diethylsilylene(3-phenyl-1-indenyl)(2,3,4,5-tetramethyl-1-cyclopentadienyl)zirconium dichloride;
dipropylsilylene(3-phenyl-1-indenyl)(2,3,4,5-tetramethyl-1-cyclopentadienyl)zirconium dichloride;
dibutylsilylene(3-phenyl-1-indenyl)(2,3,4,5-tetramethyl-1-cyclopentadienyl)zirconium dichloride;
diphenylsilylene(3-phenyl-1-indenyl)(2,3,4,5-tetramethyl-1-cyclopentadienyl)zirconium dichloride;
silacyclobutylidene(3-phenyl-1-indenyl)(2,3,4,5-tetramethyl-1-cyclopentadienyl)zirconium dichloride;
silacyclopentylidene(3-phenyl-1-indenyl)(2,3,4,5-tetramethyl-1-cyclopentadienyl)zirconium dichloride;
silacyclohexylidene(3-phenyl-1-indenyl)(2,3,4,5-tetramethyl-1-cyclopentadienyl)zirconium dichloride;
dimethylgermylene(3-phenyl-1-indenyl)(2,3,4,5-tetramethyl-1-cyclopentadienyl)zirconium dichloride;
diethylgermylene(3-phenyl-1-indenyl)(2,3,4,5-tetramethyl-1-cyclopentadienyl)zirconium dichloride;
dipropylgermylene(3-phenyl-1-indenyl)(2,3,4,5-tetramethyl-1-cyclopentadienyl)zirconium dichloride;
dibutylgermylene(3-phenyl-1-indenyl)(2,3,4,5-tetramethyl-1-cyclopentadienyl)zirconium dichloride;
diphenylgermylene(3-phenyl-1-indenyl)(2,3,4,5-tetramethyl-1-cyclopentadienyl)zirconium dichloride;
isopropylidene(3-phenyl-1-indenyl)(2,3,4,5-tetramethyl-1-cyclopentadienyl)zirconium dichloride;
diphenylmethylene(3-phenyl-1-indenyl)(2,3,4,5-tetramethyl-1-cyclopentadienyl)zirconium dichloride;
dimethylsilylene(2-methyl-3-phenyl-1-indenyl)(2,3,4,5-tetramethyl-1-cyclopentadienyl)zirconium dichloride;
dimethylsilylene(2-ethyl-3-phenyl-1-indenyl)(2,3,4,5-tetramethyl-1-cyclopentadienyl)zirconium dichloride;
dimethylsilylene(2-propyl-3-phenyl-1-indenyl)(2,3,4,5-tetramethyl-1-cyclopentadienyl)zirconium dichloride;
dimethylsilylene(2-isopropyl-3-phenyl-1-indenyl)(2,3,4,5-tetramethyl-1-cyclopentadienyl)zirconium dichloride;
dimethylsilylene(4-methyl-3-phenyl-1-indenyl)(2,3,4,5-tetramethyl-1-cyclopentadienyl)zirconium dichloride;
dimethylsilylene(4,7-dimethyl-3-phenyl-1-indenyl)(2,3,4,5-tetramethyl-1-cyclopentadienyl)zirconium dichloride;
dimethylsilylene(5,6-dimethyl-3-phenyl-1-indenyl)(2,3,4,5-tetramethyl-1-cyclopentadienyl)zirconium dichloride;
dimethylsilylene(2,4-dimethyl-3-phenyl-1-indenyl)(2,3,4,5-tetramethyl-1-cyclopentadienyl)zirconium dichloride;
dimethylsilylene(2,6-dimethyl-3-phenyl-1-indenyl)(2,3,4,5-tetramethyl-1-cyclopentadienyl)zirconium dichloride;
dimethylsilylene(3-phenyl-2,4,6-trimethyl-1-indenyl)(2,3,4,5-tetramethyl-1-cyclopentadienyl)zirconium dichloride;
dimethylsilylene(3-phenyl-2,4,7-trimethyl-1-indenyl)(2,3,4,5-tetramethyl-1-cyclopentadienyl)zirconium dichloride;
dimethylsilylene(3-phenyl-2,5,6-trimethyl-1-indenyl)(2,3,4,5-tetramethyl-1-cyclopentadienyl)zirconium dichloride;
dimethylsilylene(3-phenyl-4,5,6,7-tetramethyl-1-indenyl)(2,3,4,5-tetramethyl-1-cyclopentadienyl)zirconium dichloride;

dimethylsilylene(2,4,5,6,7-pentamethyl-3-phenyl-1-indenyl)(2,3,4,5-tetramethyl-1-cyclopentadienyl)zirconium dichloride;
dimethylsilylene(6-chloro-3-phenyl-1-indenyl)(2,3,4,5-tetramethyl-1-cyclopentadienyl)zirconium dichloride;
dimethylsilylene(7-chloro-3-phenyl-1-indenyl)(2,3,4,5-tetramethyl-1-cyclopentadienyl)zirconium dichloride;
dimethylsilylene(4,6-dichloro-3-phenyl-1-indenyl)(2,3,4,5-tetramethyl-1-cyclopentadienyl)zirconium dichloride;
dimethylsilylene(5,7-dichloro-2-methyl-3-phenyl-1-indenyl)(2,3,4,5-tetramethyl-1-cyclopentadienyl)zirconium dichloride;
dimethylsilylene(2-butyl-7-chloro-3-phenyl-1-indenyl)(2,3,4,5-tetramethyl-1-cyclopentadienyl)zirconium dichloride;
dimethylsilylene(7-chloro-3-phenyl-2-propyl-1-indenyl)(2,3,4,5-tetramethyl-1-cyclopentadienyl)zirconium dichloride;
dimethylsilylene(7-chloro-2-ethyl-3-phenyl-1-indenyl)(2,3,4,5-tetramethyl-1-cyclopentadienyl)zirconium dichloride;
dimethylsilylene(5-fluoro-3-phenyl-1-indenyl)(2,3,4,5-tetramethyl-1-cyclopentadienyl)zirconium dichloride;
dimethylsilylene(5,7-difluoro-3-phenyl-1-indenyl)(2,3,4,5-tetramethyl-1-cyclopentadienyl)zirconium dichloride;
dimethylsilylene(4,6-difluoro-3-phenyl-1-indenyl)(2,3,4,5-tetramethyl-1-cyclopentadienyl)zirconium dichloride;
dimethylsilylene(5,7-difluoro-2-methyl-3-phenyl-1-indenyl)(2,3,4,5-tetramethyl-1-cyclopentadienyl)zirconium dichloride;
dimethylsilylene(3-phenyl-1,5,6,7-tetrahydro-s-1-indacenyl)(2,3,4,5-tetramethyl-1-cyclopentadienyl)zirconium dichloride;
dimethylsilylene(2-methyl-3-phenyl-1,5,6,7-tetrahydro-s-1-indacenyl)(2,3,4,5-tetramethyl-1-cyclopentadienyl)zirconium dichloride;
dimethylsilylene(6,6-dimethyl-3-phenyl-1,5,6,7-tetrahydro-s-1-indacenyl)(2,3,4,5-tetramethyl-1-cyclopentadienyl)zirconium dichloride;
dimethylsilylene(3-phenyl-2,6,6-trimethyl-1,5,6,7-tetrahydro-s-1-indacenyl)(2,3,4,5-tetramethyl-1-cyclopentadienyl)zirconium dichloride;
dimethylsilylene(3-pheny-5,5,8,8-tetramethyl-5,6,7,8-tetrahydrobenz[f]-1-indenyl)(2,3,4,5-tetramethyl-1-cyclopentadienyl)zirconium dichloride;
dimethylsilylene(3-phenylbenz[f]-1-indenyl)(2,3,4,5-tetramethyl-1-cyclopentadienyl)zirconium dichloride;
dimethylsilylene(2-methyl-3-phenylbenz[f]-1-indenyl)(2,3,4,5-tetramethyl-1-cyclopentadienyl)zirconium dichloride;
dimethylsilylene(2,5,5,8,8-pentamethyl-3-phenyl-5,6,7,8-tetrahydrobenz[f]-1-indenyl)(2,3,4,5-tetramethyl-1-cyclopentadienyl)zirconium dichloride;
dimethylsilylene(3-phenylbenz[e]-1-indenyl)(2,3,4,5-tetramethyl-1-cyclopentadienyl)zirconium dichloride;
dimethylsilylene(2-methyl-3-phenylbenz[e]-1-indenyl)(2,3,4,5-tetramethyl-1-cyclopentadienyl)zirconium dichloride;
dimethylsilylene(3-(4-methylphenyl)-1-indenyl)(2,3,4,5-tetramethyl-1-cyclopentadienyl)zirconium dichloride;
dimethylsilylene(3-(3,5-dimethylphenyl)-1-indenyl)(2,3,4,5-tetramethyl-1-cyclopentadienyl)zirconium dichloride;
dimethylsilylene(3-(2,6-dimethylphenyl)-1-indenyl)(2,3,4,5-tetramethyl-1-cyclopentadienyl)zirconium dichloride;
dimethylsilylene(3-(2,4-dimethylphenyl)-1-indenyl)(2,3,4,5-tetramethyl-1-cyclopentadienyl)zirconium dichloride;
dimethylsilylene(3-(3,4-dimethylphenyl)-1-indenyl)(2,3,4,5-tetramethyl-1-cyclopentadienyl)zirconium dichloride;
dimethylsilylene(3-(2,3-dimethylphenyl)-1-indenyl)(2,3,4,5-tetramethyl-1-cyclopentadienyl)zirconium dichloride;
dimethylsilylene(3-(2,5-dimethylphenyl)-1-indenyl)(2,3,4,5-tetramethyl-1-cyclopentadienyl)zirconium dichloride;
dimethylsilylene(3-(2,4,6-trimethylphenyl)-1-indenyl)(2,3,4,5-tetramethyl-1-cyclopentadienyl)zirconium dichloride;
dimethylsilylene(3-(2,3,4-trimethylphenyl)-1-indenyl)(2,3,4,5-tetramethyl-1-cyclopentadienyl)zirconium dichloride;
dimethylsilylene(3-(3,4,5-trimethylphenyl)-1-indenyl)(2,3,4,5-tetramethyl-1-cyclopentadienyl)zirconium dichloride;
dimethylsilylene(3-(2,3,5-trimethylphenyl)-1-indenyl)(2,3,4,5-tetramethyl-1-cyclopentadienyl)zirconium dichloride;
dimethylsilylene(3-(2,3,6-trimethylphenyl)-1-indenyl)(2,3,4,5-tetramethyl-1-cyclopentadienyl)zirconium dichloride;
dimethylsilylene(3-(2,4,5-trimethylphenyl)-1-indenyl)(2,3,4,5-tetramethyl-1-cyclopentadienyl)zirconium dichloride;
dimethylsilylene(3-(2,3,4,5-tetramethylphenyl)-1-indenyl)(2,3,4,5-tetramethyl-1-cyclopentadienyl)zirconium dichloride;
dimethylsilylene(3-(2,3,4,5-tetramethylphenyl)-1-indenyl)(2,3,4,5-tetramethyl-1-cyclopentadienyl)zirconium dichloride;
dimethylsilylene(3-(2,3,4,6-tetramethylphenyl)-1-indenyl)(2,3,4,5-tetramethyl-1-cyclopentadienyl)zirconium dichloride;
dimethylsilylene(3-(2,3,5,6-tetramethylphenyl)-1-indenyl)(2,3,4,5-tetramethyl-1-cyclopentadienyl)zirconium dichloride;
dimethylsilylene(3-(2,3,4,5,6-pentamethylphenyl)-1-indenyl)(2,3,4,5-tetramethyl-1-cyclopentadienyl)zirconium dichloride;
dimethylsilylene(3-(2-methylphenyl)-1-indenyl)(2,3,4,5-tetramethyl-1-cyclopentadienyl)zirconium dichloride;
dimethylsilylene(3-(2-ethylphenyl)-1-indenyl)(2,3,4,5-tetramethyl-1-cyclopentadienyl)zirconium dichloride;
dimethylsilylene(3-(2-propylphenyl)-1-indenyl)(2,3,4,5-tetramethyl-1-cyclopentadienyl)zirconium dichloride;
dimethylsilylene(3-(2-butylphenyl)-1-indenyl)(2,3,4,5-tetramethyl-1-cyclopentadienyl)zirconium dichloride;
dimethylsilylene(3-(3-methylphenyl)-1-indenyl)(2,3,4,5-tetramethyl-1-cyclopentadienyl)zirconium dichloride;
dimethylsilylene(3-(3-ethylphenyl)-1-indenyl)(2,3,4,5-tetramethyl-1-cyclopentadienyl)zirconium dichloride;
dimethylsilylene(3-(3-propylphenyl)-1-indenyl)(2,3,4,5-tetramethyl-1-cyclopentadienyl)zirconium dichloride;
dimethylsilylene(3-(3-butylphenyl)-1-indenyl)(2,3,4,5-tetramethyl-1-cyclopentadienyl)zirconium dichloride;
dimethylsilylene(3-(3-t-butylphenyl)-1-indenyl)(2,3,4,5-tetramethyl-1-cyclopentadienyl)zirconium dichloride;
dimethylsilylene(3-(4-methylphenyl)-1-indenyl)(2,3,4,5-tetramethyl-1-cyclopentadienyl)zirconium dichloride;
dimethylsilylene(3-(4-ethylphenyl)-1-indenyl)(2,3,4,5-tetramethyl-1-cyclopentadienyl)zirconium dichloride;
dimethylsilylene(3-(4-propylphenyl)-1-indenyl)(2,3,4,5-tetramethyl-1-cyclopentadienyl)zirconium dichloride;
dimethylsilylene(3-(4-butylphenyl)-1-indenyl)(2,3,4,5-tetramethyl-1-cyclopentadienyl)zirconium dichloride;
dimethylsilylene(3-(4-t-butylphenyl)-1-indenyl)(2,3,4,5-tetramethyl-1-cyclopentadienyl)zirconium dichloride;

dimethylsilylene(3-(4-biphenyl)-1-indenyl)(2,3,4,5-tetramethyl-1-cyclopentadienyl)zirconium dichloride;
dimethylsilylene(3-(3-biphenyl)-1-indenyl)(2,3,4,5-tetramethyl-1-cyclopentadienyl)zirconium dichloride;
dimethylsilylene(3-(2-biphenyl)-1-indenyl)(2,3,4,5-tetramethyl-1-cyclopentadienyl)zirconium dichloride;
dimethylsilylene(3-(3,5-diphenylphenyl)-1-indenyl)(2,3,4,5-tetramethyl-1-cyclopentadienyl)zirconium dichloride;
dimethylsilylene(3-(3,5-di-t-butylphenyl)-1-indenyl)(2,3,4,5-tetramethyl-1-cyclopentadienyl)zirconium dichloride;
dimethylsilylene(3-(2-fluorophenyl)-1-indenyl)(2,3,4,5-tetramethyl-1-cyclopentadienyl)zirconium dichloride;
dimethylsilylene(3-(3-fluorophenyl)-1-indenyl)(2,3,4,5-tetramethyl-1-cyclopentadienyl)zirconium dichloride;
dimethylsilylene(3-(4-fluorophenyl)-1-indenyl)(2,3,4,5-tetramethyl-1-cyclopentadienyl)zirconium dichloride;
dimethylsilylene(3-(2,3-difluorophenyl)-1-indenyl)(2,3,4,5-tetramethyl-1-cyclopentadienyl)zirconium dichloride;
dimethylsilylene(3-(2,4-difluorophenyl)-1-indenyl)(2,3,4,5-tetramethyl-1-cyclopentadienyl)zirconium dichloride;
dimethylsilylene(3-(2,5-difluorophenyl)-1-indenyl)(2,3,4,5-tetramethyl-1-cyclopentadienyl)zirconium dichloride;
dimethylsilylene(3-(2,6-difluorophenyl)-1-indenyl)(2,3,4,5-tetramethyl-1-cyclopentadienyl)zirconium dichloride;
dimethylsilylene(3-(3,4-difluorophenyl)-1-indenyl)(2,3,4,5-tetramethyl-1-cyclopentadienyl)zirconium dichloride;
dimethylsilylene(3-(3,5-difluorophenyl)-1-indenyl)(2,3,4,5-tetramethyl-1-cyclopentadienyl)zirconium dichloride;
dimethylsilylene(3-(2,3,4-trifluorophenyl)-1-indenyl)(2,3,4,5-tetramethyl-1-cyclopentadienyl)zirconium dichloride;
dimethylsilylene(3-(2,3,5-trifluorophenyl)-1-indenyl)(2,3,4,5-tetramethyl-1-cyclopentadienyl)zirconium dichloride;
dimethylsilylene(3-(2,3,6-trifluorophenyl)-1-indenyl)(2,3,4,5-tetramethyl-1-cyclopentadienyl)zirconium dichloride;
dimethylsilylene(3-(2,4,5-trifluorophenyl)-1-indenyl)(2,3,4,5-tetramethyl-1-cyclopentadienyl)zirconium dichloride;
dimethylsilylene(3-(2,4,6-trifluorophenyl)-1-indenyl)(2,3,4,5-tetramethyl-1-cyclopentadienyl)zirconium dichloride;
dimethylsilylene(3-(3,4,5-trifluorophenyl)-1-indenyl)(2,3,4,5-tetramethyl-1-cyclopentadienyl)zirconium dichloride;
dimethylsilylene(3-(2,3,4,5-tetrafluorophenyl)-1-indenyl)(2,3,4,5-tetramethyl-1-cyclopentadienyl)zirconium dichloride;
dimethylsilylene(3-(2,3,4,6-tetrafluorophenyl)-1-indenyl)(2,3,4,5-tetramethyl-1-cyclopentadienyl)zirconium dichloride;
dimethylsilylene(3-(2,3,5,6-tetrafluorophenyl)-1-indenyl)(2,3,4,5-tetramethyl-1-cyclopentadienyl)zirconium dichloride;
dimethylsilylene(3-(pentafluorophenyl)-1-indenyl)(2,3,4,5-tetramethyl-1-cyclopentadienyl)zirconium dichloride;
dimethylsilylene(3-(2-chlorophenyl)-1-indenyl)(2,3,4,5-tetramethyl-1-cyclopentadienyl)zirconium dichloride;
dimethylsilylene(3-(3-chlorophenyl)-1-indenyl)(2,3,4,5-tetramethyl-1-cyclopentadienyl)zirconium dichloride;
dimethylsilylene(3-(4-chlorophenyl)-1-indenyl)(2,3,4,5-tetramethyl-1-cyclopentadienyl)zirconium dichloride;
dimethylsilylene(3-(2,6-dichlorophenyl)-1-indenyl)(2,3,4,5-tetramethyl-1-cyclopentadienyl)zirconium dichloride;
dimethylsilylene(3-(3,5-dichlorophenyl)-1-indenyl)(2,3,4,5-tetramethyl-1-cyclopentadienyl)zirconium dichloride;
dimethylsilylene(3-(2,4,6-trichlorophenyl)-1-indenyl)(2,3,4,5-tetramethyl-1-cyclopentadienyl)zirconium dichloride;
dimethylsilylene(3-(2-trifluoromethylphenyl)-1-indenyl)(2,3,4,5-tetramethyl-1-cyclopentadienyl)zirconium dichloride;
dimethylsilylene(3-(3-trifluoromethylphenyl)-1-indenyl)(2,3,4,5-tetramethyl-1-cyclopentadienyl)zirconium dichloride;
dimethylsilylene(3-(4-trifluoromethylphenyl)-1-indenyl)(2,3,4,5-tetramethyl-1-cyclopentadienyl)zirconium dichloride;
dimethylsilylene(3-(3,5-bis(trifluoromethyl)phenyl)-1-indenyl)(2,3,4,5-tetramethyl-1-cyclopentadienyl)zirconium dichloride;
dimethylsilylene(3-(2-methoxyphenyl)-1-indenyl)(2,3,4,5-tetramethyl-1-cyclopentadienyl)zirconium dichloride;
dimethylsilylene(3-(3-methoxyphenyl)-1-indenyl)(2,3,4,5-tetramethyl-1-cyclopentadienyl)zirconium dichloride;
dimethylsilylene(3-(4-methoxyphenyl)-1-indenyl)(2,3,4,5-tetramethyl-1-cyclopentadienyl)zirconium dichloride;
dimethylsilylene(3-(2,6-dimethoxyphenyl)-1-indenyl)(2,3,4,5-tetramethyl-1-cyclopentadienyl)zirconium dichloride;
dimethylsilylene(3-(3,5-dimethoxyphenyl)-1-indenyl)(2,3,4,5-tetramethyl-1-cyclopentadienyl)zirconium dichloride;
dimethylsilylene(3-(2,4,6-trimethoxyphenyl)-1-indenyl)(2,3,4,5-tetramethyl-1-cyclopentadienyl)zirconium dichloride;
dimethylsilylene(3-(1-naphthyl)-1-indenyl)(2,3,4,5-tetramethyl-1-cyclopentadienyl)zirconium dichloride;
dimethylsilylene(3-(2-naphthyl)-1-indenyl)(2,3,4,5-tetramethyl-1-cyclopentadienyl)zirconium dichloride;
dimethylsilylene(2-methyl-3-(2-naphthyl)-1-indenyl)(2,3,4,5-tetramethyl-1-cyclopentadienyl)zirconium dichloride;
dimethylsilylene(3-(1-anthryl)-1-indenyl)(2,3,4,5-tetramethyl-1-cyclopentadienyl)zirconium dichloride;
dimethylsilylene(3-(2-anthryl)-1-indenyl)(2,3,4,5-tetramethyl-1-cyclopentadienyl)zirconium dichloride;
dimethylsilylene(3-(9-anthryl)-1-indenyl)(2,3,4,5-tetramethyl-1-cyclopentadienyl)zirconium dichloride;
dimethylsilylene(3-(9-phenanthryl)-1-indenyl)(2,3,4,5-tetramethyl-1-cyclopentadienyl)zirconium dichloride;
dimethylsilylene(3-(2-furanyl)-1-indenyl)(2,3,4,5-tetramethyl-1-cyclopentadienyl)zirconium dichloride;
dimethylsilylene(3-(2-furanyl)-2-methyl-1-indenyl)(2,3,4,5-tetramethyl-1-cyclopentadienyl)zirconium dichloride;
dimethylsilylene(3-(3-furanyl)-1-indenyl)(2,3,4,5-tetramethyl-1-cyclopentadienyl)zirconium dichloride;
dimethylsilylene(3-(3-furanyl)-2-methyl-1-indenyl)(2,3,4,5-tetramethyl-1-cyclopentadienyl)zirconium dichloride;
dimethylsilylene(3-(2-thiophenyl)-1-indenyl)(2,3,4,5-tetramethyl-1-cyclopentadienyl)zirconium dichloride;
dimethylsilylene(2-methyl-3-(2-thiophenyl)-1-indenyl)(2,3,4,5-tetramethyl-1-cyclopentadienyl)zirconium dichloride;
dimethylsilylene(3-(3-thiophenyl)-1-indenyl)(2,3,4,5-tetramethyl-1-cyclopentadienyl)zirconium dichloride;
dimethylsilylene(2-methyl-3-(3-thiophenyl)-1-indenyl)(2,3,4,5-tetramethyl-1-cyclopentadienyl)zirconium dichloride;
dimethylsilylene(3-(2-pyridyl)-1-indenyl)(2,3,4,5-tetramethyl-1-cyclopentadienyl)zirconium dichloride;
dimethylsilylene(2-methyl-3-(2-pyridyl)-1-indenyl)(2,3,4,5-tetramethyl-1-cyclopentadienyl)zirconium dichloride;
dimethylsilylene(3-(3-pyridyl)-1-indenyl)(2,3,4,5-tetramethyl-1-cyclopentadienyl)zirconium dichloride;
dimethylsilylene(2-methyl-3-(3-pyridyl)-1-indenyl)(2,3,4,5-tetramethyl-1-cyclopentadienyl)zirconium dichloride;
titanium and hafnium analogs of the above zirconium dichloride compounds wherein the zirconium transition metal is replaced with titanium or hafnium; and dimethyl analogs of the above dichloride compounds wherein the chloride groups on the zirconium, hafnium, or titanium transition metal are replaced with methyl groups.

The catalysts represented by Formulas I and II may be used in any ratio. Preferred molar ratios of metal in (A) compound(s) represented by Formula I to metal in (B) compound(s) represented by Formula II (i.e. the molar ratio of M* to M) fall within the range of 1:1000 to 1000:1, 1:100 to 500:1, 1:10 to 200:1, 1:1 to 100:1, 1:1 to 75:1, or 5:1 to 50:1. The particular ratio chosen will depend on the exact compounds chosen, the method of activation, and the end product desired. When using the two catalyst compounds where both are activated with the same activator, useful mole percents, based upon the molecular weight of the catalyst compounds, may be from 10 to 99.9% A to 0.1 to 90% B, 25 to 99% A to 0.5 to 50% B, 50 to 99% A to 1 to 25% B, or 75 to 99% A to 1 to 10% B.

The molar ratio of the metal in the compound(s) represented by Formula I to the metal in the compound(s) represented by Formula II is from 0.1:1 to 100:1, preferably from 0.25:1 to 75:1, preferably from 0.25:1 to 50:1, preferably from 0.5:1 to 30:1, preferably from 0.75:1 to 20:1, preferably from 0.8:1 to 10:1, preferably from 0.8:1 to 5:1, preferably from 0.8:1 to 2:1. In a preferred embodiment of the invention, M* is Cr and M is Zr, and the Cr to Zr molar ratio for the catalyst compounds is from 0.1:1 to 100:1, preferably from 0.25:1 to 75:1, preferably from 0.25:1 to 50:1, preferably from 0.5:1 to 30:1, preferably from 0.75:1 to 20:1, preferably from 0.8:1 to 10:1, preferably from 0.8:1 to 5:1, preferably from 0.8:1 to 2:1.

When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. In a useful embodiment, compatible catalysts are capable of simultaneously making different polyethylene copolymers. Evidence of two different copolymers is shown in the GPC data from polymer samples derived from the mixed catalyst.

Methods to Prepare the Catalyst Compounds

Useful catalyst compounds represented by Formula I can be prepared by means known in the art, such as those described in DE 19710615, WO 2012/040147, and US 2013/0225820. For example, ethylene(cyclopentadienyl)(pyrrolidine)chromium dichloride may be prepared by the method described in J. *Organometallics* 2000, 19, 388-402 (Dohring, et al.).

Useful catalyst compounds represented by Formula II can be prepared by means known in the art, such as those described in WO 2014/099303.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane activators may be utilized as an activator. Alumoxanes are generally oligomeric compounds containing —Al(R1)-O— sub-units, where R1 is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane may be used. A cloudy or gelled alumoxane can be filtered to produce a clear solution or clear alumoxane can be decanted from the cloudy solution.

When the activator is an alumoxane (modified or unmodified), the maximum amount of activator may be a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Little or no alumoxane may also be used in the polymerization processes described herein. For example, alumoxane may be present at zero mole %, or the alumoxane may be present at a molar ratio of aluminum to catalyst compound transition metal less than 500:1, less than 300:1, less than 100:1, or less than 1:1.

The term "non-coordinating anion" (NCA) means an anion which either does not coordinate to a cation or which is only weakly coordinated to a cation thereby remaining sufficiently labile to be displaced by a neutral Lewis base. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Boron-containing NCA activators represented by the formula below may be used:

wherein Z is (L-H) or a reducible Lewis Acid, L is an neutral Lewis base; H is hydrogen; (L-H)$^+$ is a Bronsted acid; A$^{d-}$ is a non-coordinating anion having the charge d–; and d is an integer from 1 to 3.

When Z is (L-H) such that the cation component is (L-H)$_{d+}$, the cation component may include Bronsted acids such as protonated Lewis bases capable of protonating a moiety, such as an alkyl or aryl, from the bulky ligand metallocene containing transition metal catalyst precursor, resulting in a cationic transition metal species. When Z is a reducible Lewis acid it may be represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. The reducible Lewis acid may be triphenyl carbenium.

The anion component A$^{d-}$ may include those having the formula [M$^{k+}$Q$_n$]$^{d-}$ wherein k is 1, 2, or 3; n is 1, 2, 3, 4, 5, or 6, preferably 3, 4, 5 or 6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Each Q may be a fluorinated hydrocarbyl group having 1 to 20 carbon atoms, a fluorinated aryl group, or a pentafluoro aryl group. Examples of suitable A$^{d-}$ components also include diboron compounds as disclosed in U.S. Pat. No. 5,447,895, which is fully incorporated herein by reference.

In any NCAs represented by formula 2 above, the reducible Lewis acid is represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl.

Bulky activators may also be useful herein. A "Bulky activator" as used herein refers to anionic activators represented by the formula:

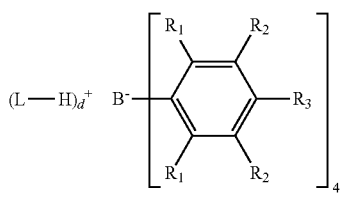

wherein:
each R$_1$ is, independently, a halide, preferably a fluoride;
each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_2$ is a fluoride or a perfluorinated phenyl group); each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);
L is an neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of possibly useful Bulky activators please see U.S. Pat. No. 8,658,556, which is incorporated by reference herein. Additionally, an NCA activator may be chosen from the activators described in U.S. Pat. No. 6,211,105, which is incorporated by reference herein.

It is also within the scope of this invention to use activators that are a combination of alumoxanes and NCAs (see for example, U.S. Pat. No. 5,153,157, U.S. Pat. No. 5,453,410, EP 0 573 120, WO 94/07928, and WO 95/14044 which discuss the use of an alumoxane in combination with an ionizing activator).

In a catalyst system comprising more than one transition metal compound, it is often preferable to use the same activator for the transition metal compounds. However, two different activators, such as a non-coordinating anion activator and an alumoxane, can be used in combination.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, bis(diisobutylaluminum)oxide, and diethyl zinc.

Support Materials

The catalyst system comprises an inert support material. Preferably the supported material is a porous support material, for example, talc, and inorganic oxides. Other support materials include zeolites, clays, organoclays, or any other organic or inorganic support material and the like, or mixtures thereof.

The support material may be an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

The support material, such as an inorganic oxide, may have a surface area in the range of from about 10 to about 700 $m^2/g$, pore volume in the range of from about 0.1 to about 4.0 cc/g and average particle size in the range of from about 5 to about 500 μm. The surface area of the support material may be in the range of from about 50 to about 500 $m^2/g$, pore volume of from about 0.5 to about 3.5 cc/g and average particle size of from about 10 to about 200 μm. Additionally, the surface area of the support material may be in the range is from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$).

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours.

Polymerization Processes

The invention also relates to polymerization processes where monomer (such as ethylene or propylene), and optionally comonomer, are contacted with a catalyst compound as described above and an activator. The catalyst compound and activator may be combined in any order, and are combined typically prior to contacting with the monomer.

Monomers useful herein include substituted or unsubstituted $C_2$ to $C_{40}$ alpha olefins, $C_2$ to $C_{20}$ alpha olefins, $C_2$ to $C_{12}$ alpha olefins, and preferably ethylene, propylene, butene, pentene, hexene, heptene, octene, nonene, decene, undecene, dodecene and isomers thereof. The monomer may comprise propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. The monomer may comprise ethylene and an optional comonomers comprising one or more $C_3$ to $C_{40}$ olefins, $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. A bulk homogeneous process is particularly preferred. A bulk process is defined to be a process where monomer concentration in all feeds to the reactor is 70 vol % or more. Alternately, no solvent or diluent is present or added in the reaction medium (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). If the polymerization is carried out as a suspension or solution polymerization, an inert solvent may be used, for example, the polymerization may be carried out in suitable diluents/solvents. Suitable diluents/solvents for polymerization include non-coordinating, inert liquids.

The feed concentration of the monomers and comonomers for the polymerization may be 60 vol % solvent or less, preferably 40 vol % or less, or preferably 20 vol % or less, based on the total volume of the feedstream. Preferably the polymerization is run in a bulk process.

Polymerizations can be run at any temperature and/or pressure suitable to obtain the desired polymers. Typical temperatures and/or pressures include a temperature in the range of from about 0° C. to about 300° C., preferably about 20° C. to about 200° C., preferably about 60° C. to about 180° C., preferably from about 70° C. to about 170° C., preferably from about 80° C. to about 160° C.; and at a pressure in the range of from about 0.35 MPa to about 10 MPa, preferably from about 0.45 MPa to about 6 MPa, or preferably from about 0.5 MPa to about 4 MPa.

Hydrogen may be present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Polyolefin Products

This invention also relates to polyolefins produced using the catalyst systems of the invention. The process described herein may produce propylene homopolymers or propylene copolymers, such as propylene-ethylene and/or propylene-alphaolefin (preferably $C_4$ to $C_{20}$) copolymers (such as propylene-hexene copolymers or propylene-octene copolymers) having a Mw/Mn of greater than 1 to 4 (preferably greater than 1 to 3).

Likewise, the polymers produced herein may be homopolymers of ethylene, or copolymers of ethylene having from 0 to 25 mole %, 0.5 to 20 mole %, 1 to 15 mole %, 2 to 10 mole %, or 2.5 to 3 mole % of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

Likewise, the polymers produced herein may be ethylene-diene copolymers preferably having from 0 to 25 mole % (alternately from 0.5 to 20 mole %, alternately from 1 to 15 mole %, preferably from 3 to 10 mole %) of one or more $C_6$ to $C_{12}$ non-conjugated diene (preferably 1,4-hexadiene, or 5-ethylidenebicyclo[2.2.1]hept-2-ene).

The polymers produced herein may have an Mw of 4,000 to 5,000,000 g/mol; 10,000 to 2,000,000 g/mol; 25,000 to 750,000 g/mol; or 50,000 to 500,000 g/mol; and/or an Mw/Mn of about 1 to 40, 2 to 20, 3 to 10, 5 to 10, 6 to 9, or 7 to 8.

In a preferred embodiment of the invention, the polymer produced herein has a multimodal molecular weight distribution as determined by Gel Permeation Chromotography (GPC). In a preferred embodiment of the invention, the polymer produced herein does not have a unimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus). Typically, the polymers produced herein have a bimodal or trimodal molecular weight distribution.

Unless otherwise indicated and for purposes of the claims to this invention Mw, Mn, MWD are determined by GPC as described in US 2006/0173123 pages 24-25, paragraphs [0334] to [0341].

The polymer may have a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8, as well as in Wild et al., J. Poly. Sci., Poly. Phys. Ed., Vol. 20, p. 441 (1982), and U.S. Pat. No. 5,008,204, including that fractions having a weight average molecular weight (Mw) below 15,000 are ignored when determining CDBI.

Blends

The polymer produced herein may be combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Applications

The polymers may be used in a variety of end-use applications. The polymers described herein may be useful in making pipes, films, blow molded articles, and rotomolded articles. Methods for producing pipes from polyethylenes are well known in the art. Any size extruder suitable for extruding the multimodal polyethylene for forming a pipe can be used. Additional applications include, for example, mono- or multi-layer blown, extruded, and/or shrink films. These films may be formed by any number of well known extrusion or co-extrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents.

EXPERIMENTAL

MAO is methylaluminoxane (30 wt % in toluene) obtained from Albemarle Corporation.

Synthesis of Catalyst A

A solution of 30 wt % MAO in toluene (0.954 g; 4.93 mmol) was added to 980 mg of toluene, and then this solution was stirred for 15 min. To this solution was added 11 mg of dimethylsilylene(3-phenyl-1-indenyl)(2,3,4,5-tetramethyl-1-cyclopentadienyl)zirconium dichloride (0.020 mmol). This mixture was stirred for 15 min, and then 0.760 g of silica (Grace Davison 948, calcined at 600° C.) was added. This mixture was stirred for 10 min, and then dried in vacuo to yield 1.001 g of the supported catalyst (Catalyst A).

Synthesis of Catalyst B

In 1 mL of toluene, 2.3 mg of ethylene (cyclopentadienyl)(pyrrolidine)chromium dimethyl was dissolved, producing a green solution. Then 518 mg of Catalyst A from above was added to the solution. This mixture was stirred for 10 minutes, and subsequently dried under vacuum, yielding 458.6 mg of Catalyst B.

Polymerization

A 2 liter zipper autoclave reactor was heated to 130° C. using a steam/water mix, and purged with nitrogen for 90 minutes. It was then was charged with 700 mL of isohexane, 30 mL of 1-hexene, and a 2 mL solution of tri-n-octylaluminum dissolved in hexane (0.11 M). The reactor was brought to process temperature (80° C.) and charged with ethylene to process pressure (183 psig=1261 kPa). The supported catalyst (50 mg) was then injected into the reactor using ethylene, and the polymerization reaction was allowed to run for 60 minutes, with stirring being maintained at 500 rpm. Temperature was maintained within +/−2° C., and pressure was maintained within +/−2 psig by a computer-controlled mass-flow controller and a regulator. After 60 minutes, the reactor was allowed to cool to 50° C. and then vented, the solvent was removed, and the yield was determined Yields are reported in Table 1 and include the total weight of polymer and residual catalyst. Catalyst activity is also reported in Table 1 as grams of polymer per mmol of transition metal compound per atmosphere of ethylene per hour of reaction time (g/mmol·atm·hr).

Polymer Characterization

Polymer characterization results for the polyethylene samples produced are also reported in Table 1.

Gel permeation chromatography was performed on a Waters Alliance GPC 2000 or a PL GPC 220 (Agilent Technologies) equipped with a differential refractive index (DRI) detector. The solvent consisted of 1,2,4-trichlorobenzene (Sigma Aldrich, Chromasolv grade ≥99% purity) stabilized with 1000 ppm of 2,6-di-tert-butyl-4-methylphenol (Sigma Aldrich) and was filtered using a membrane filter (Millipore, polytetrafluoroethylene, 0.1 µm). All samples were dissolved at a concentration of approximately 0.5 to 1.5 mg/mL in this solvent. Dissolution was carried out at 160° C. in a shaker oven for 2-3 hours. The samples were immediately transferred to a sample carousel maintained at 145° C. (Waters Alliance GPC 2000) or an auto-sampler maintained at 150-160° C. (PL GPC 200). Separation was effected by three Mixed B columns in series (Agilent Technologies, PL-Gel 10 µm 300 mm×7.5 mm) at 145° C. (Waters Alliance GPC 2000) or 160° C. (PL GPC 200). The solvent was passed through an in-line filter (Optimize Technologies, SS frit, 2 µm) prior to entering the columns at a fixed flow rate of 1.0 mL/min.

Molecular weight was determined by a conventional calibration as described below using a set of seventeen narrow polystyrene standards (Agilent Technologies) with peak molecular weights (Mp) from ~1000 to ~10,000,000 g/mol and Mw/Mn≤1.10. Mp for the polystyrene standard provided on the certificate of analysis from the manufacturer acquired through independent characterization by viscometry and light scattering was used for calibration. The conventional calibration curve was generated by fitting a second order polynomial to a plot of the log Mp vs. retention volume for the polystyrene standards in Microsoft Excel (Version 14.0.7113.5000). Using this calibration and the Mark-Houwink expression, molecular weight moments were determined for polyolefins of known composition. The composition used for GPC analysis was determined by $^{13}$C NMR or $^{1}$H NMR or FTIR.

TABLE 1

Ethylene-Hexene Copolymerization Runs

| Ex # | Catalyst | Polymer Yield (g) | Activity (g/mmol · atm · hr) | Mw | Mn | Mw/Mn |
|---|---|---|---|---|---|---|
| PE-1 | B | 57.31 | 1465 | 213.6 | 27.9 | 7.7 |
| PE-2 | B | 76.82 | 2006 | 224.6 | 22.9 | 9.8 |
| PE-3 | B | 39.96 | 1015 | 268.4 | 35 | 6.8 |

Comparison of Polymers A and B

Figure 2:
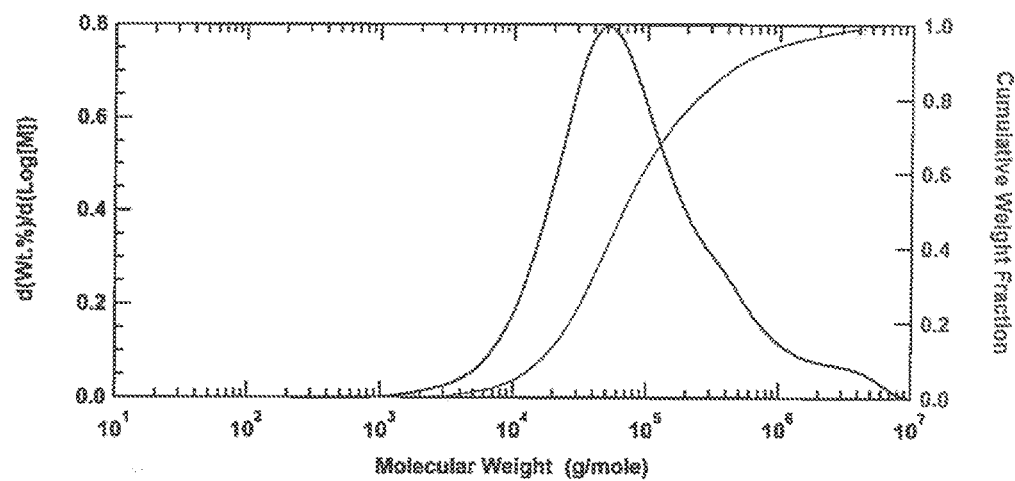
FIG. 2 is a GPC trace for a polyethylene polymer obtained using a cosupported catalyst system comprising two catalyst compounds, dimethylsilylene(3-phenyl-1-indenyl)(2,3,4,5-tetramethyl-1-cyclopentadienyl)zirconium dichloride and ethylene (cyclopentadienyl)(pyrrolidine)chromium dimethyl.

FIG. 1 is a GPC trace for a polyethylene polymer obtained using a catalyst system comprising only one catalyst compound, dimethylsilylene(3-phenyl-1-indenyl)(2,3,4,5-tetramethyl-1-cyclopentadienyl)zirconium dichloride ("Polymer A"). FIG. 2 is a GPC trace for Example PE-3 in Table 1, a polyethylene polymer obtained using a cosupported catalyst system comprising two catalyst compounds, dimethylsilylene(3-phenyl-1-indenyl)(2,3,4,5-tetramethyl-1-cyclopentadienyl)zirconium dichloride and ethylene (cyclopentadienyl)(pyrrolidine)chromium dimethyl ("Polymer B"), according to embodiments of the invention.

By comparing FIGS. 1 and 2, it can be seen that the two catalysts in the cosupported catalyst system are compatible in the sense that they are capable of simultaneously making different polyethylene copolymer resins. FIG. 2 also shows that Polymer B, although produced by a catalyst system comprising only two catalyst compounds, has a trimodal molecular weight distribution. The melt index ($I_2$, measured according to ASTM D-1238) for Polymer A in FIG. 1 was 1.123 g/10 min, while the melt index for Polymer B decreased to about 0.195 g/10 min, suggesting the presence of an UHMWPE in Polymer B. It is apparent that this UHMWPE species derives from the ethylene (cyclopentadienyl)(pyrrolidine)chromium dimethyl catalyst. The melt index ratio (MIR, $I_{21}/I_2$, determined according to ASTM D-1238, on the other hand, increased from 46.18 for Polymer A to 152.6 for Polymer B, reflecting the broader molecular weight distribution produced by the cosupported catalyst system. Further reflecting this change is the polydispersity (Mw/Mn), which increased from 4.9 for Polymer A to 6.8 for Polymer B.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A supported catalyst system comprising a catalyst compound represented by Formula I and a catalyst compound represented by Formula II, wherein Formula I is:

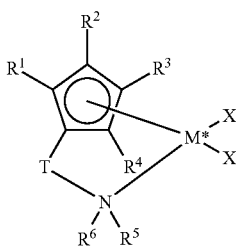

where T is a bridging group; N is nitrogen; M* is Cr, Mo, or W, where M* is in a +3 oxidation state prior to contacting with activator; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, including that two X's may form a part of a fused ring or a ring system;

each $R^1$, $R^2$, $R^3$, and $R^4$ is, independently, hydrogen, a $C_1$ to $C_{12}$ hydrocarbyl, a substituted $C_1$ to $C_{12}$ hydrocarbyl, a heteroatom, or substituted heteroatom group; and each $R^5$ and $R^6$ is, independently, a $C_1$ to $C_{12}$ hydrocarbyl, a substituted $C_1$ to $C_{12}$ hydrocarbyl, a heteroatom, or substituted heteroatom group, where the $R^5$ and $R^6$ groups may form a fused ring or multicenter fused ring system where the rings may be aromatic, partially saturated or saturated; and Formula II is:

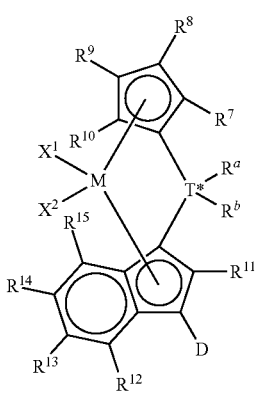

where M is a group 4 metal; T* is a group 14 atom; D is a substituted or unsubstituted aromatic group; $R^a$ and $R^b$ are, independently, hydrogen, halogen, or a $C_1$ to $C_{20}$ substituted or unsubstituted hydrocarbyl, and $R^a$ and $R^b$ can form a cyclic structure including substituted or unsubstituted aromatic, partially saturated, or saturated cyclic or fused ring system; each $X^1$ and $X^2$ is, independently, selected from the group consisting of $C_1$ to $C_{20}$ substituted or unsubstituted hydrocarbyl groups, hydrides, amides, amines, alkoxides, sulfides, phosphides, halides, dienes, phosphines, and ethers; and $X^1$ and $X^2$ can form a cyclic structure including aromatic, partially saturated, or saturated cyclic or fused ring system; each of $R^{11}$, $R^{12}$, $R^{13}$, $R^{14}$, and $R^{15}$ is, independently, hydrogen, halide, alkoxide or a $C_1$ to $C_{40}$ substituted or unsubstituted hydrocarbyl group, and any of adjacent $R^{12}$, $R^{13}$, $R^{14}$, and/or $R^{15}$ groups may form a fused ring or multicenter fused ring systems, where the rings may be substituted or unsubstituted, and may be aromatic, partially unsaturated, or unsaturated; and each of $R^7$, $R^8$, $R^9$, and $R^{10}$ is, independently, hydrogen or a $C_1$ to $C_{40}$ substituted or unsubstituted hydrocarbyl group; and further provided that at least two of $R^7$, $R^8$, $R^9$, and $R^{10}$ are $C_1$ to $C_{40}$ substituted or unsubstituted hydrocarbyl groups.

2. The catalyst system of claim 1, wherein M* is Cr and M is Zr.

3. The catalyst system of claim 1, wherein $R^5$ and $R^6$ form a fused ring or multicenter fused ring system where the rings may be aromatic, partially saturated, or saturated.

4. The catalyst system of claim 1, wherein $N(R^5)(R^6)$ is selected from the group consisting of pyrrolidine, aziridine, azetidine, piperidine, azepane, azocane, azonane, azecane, 1H-azirine, 1,2-dihydroazete, 2-pyrroline, 3-pyrroline, 1,4-dihydropyridine, azepine, azonine, indole, isoindole, indoline, isoindoline, or a substituted analog thereof.

5. The catalyst system of claim 1, wherein each $R^5$ and $R^6$, is, independently, methyl, ethyl, propyl, butyl, pentyl, hexyl, heptyl, octyl, nonyl, decyl, undecyl, docecyl, or an isomer thereof, or Cl, Br, F, I or Si; and each $R^1$, $R^2$, $R^3$, $R^4$, $R^8$, $R^9$, $R^{10}$, and $R^{11}$ is, independently, selected from the group consisting of hydrogen, methyl, ethyl, propyl, butyl, pentyl, hexyl, heptyl, octyl, nonyl, decyl, undecyl, docecyl, or an isomer thereof, Cl, F, I, Br, and Si.

6. The catalyst system of claim 1, wherein each X is, independently, selected from chloride, bromide, methyl, ethyl, propyl, butyl, and pentyl.

7. The catalyst system of claim 1, wherein T is represented by the formula, $(R^*_2 G)_g$, where each G is C, Si, or Ge, g is 1 or 2, and each R* is, independently, hydrogen, halogen, $C_1$ to $C_{20}$ hydrocarbyl or a $C_1$ to $C_{20}$ substituted hydrocarbyl, and two or more R* can form a cyclic structure including aromatic, partially saturated, or saturated cyclic or fused ring system.

8. The catalyst system of claim 1, wherein the compound represented by Formula I comprises one or more of: ethylene (cyclopentadienyl)(pyrrolidine)chromium dichloride; dimethylsilyl (cyclopentadienyl)(pyrrolidine)chromium dichloride; phenylene (cyclopentadienyl)(pyrrolidine)chromium dichloride; and diphenylsilyl (cyclopentadienyl)(pyrrolidine)chromium dichloride; and the compound represented by Formula II comprises bis(1-methyl, 3-n-butyl cyclopentadienyl)zirconium dichloride.

9. The catalyst system of claim 1, wherein D is selected from the group consisting of substituted or unsubstituted phenyl, naphthyl, biphenyl, cyclopropenyl, tropylium, cyclooctatetraenyl, furanyl, pyridinyl, borabenzyl, thiophenyl, azolyl, oxazolyl, and imidazolyl.

10. The catalyst system of claim 1, wherein T* is silicon or germanium.

11. The catalyst system of claim 1, wherein each $R^a$ and $R^b$ is, independently, selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T* being the heteroatom.

12. The catalyst system of claim 1, wherein each $X^1$ and $X^2$ is, independently, selected from the group consisting of halides and $C_1$ to $C_{20}$ substituted or unsubstituted hydrocarbyl groups.

13. The catalyst system of claim 1, wherein each of $R^7$, $R^8$, $R^9$ $R^{10}$, $R^{11}$, $R^{12}$, $R^{13}$, $R^{14}$, and $R^{15}$ is, independently, hydrogen or a $C_1$ to $C_{20}$ substituted or unsubstituted hydrocarbyl group.

14. The catalyst system of claim 1, wherein each of $R^7$, $R^8$, $R^9$, and $R^{10}$ is, independently, selected from the group consisting of methyl, ethyl, propyl, isopropyl, n-butyl, sec-butyl, t-butyl, pentyl, hexyl, heptyl, octyl, decyl, and undecyl groups.

15. The catalyst system of claim 1, wherein adjacent $R^7$, $R^8$, $R^9$, and/or $R^{10}$ groups fuse together with the cyclopentadienyl group to form a substituted or unsubstituted fluorene.

16. The catalyst system of claim 1, wherein each $R^a$ and $R^b$ is, independently, selected from the group consisting of chlorides, fluorides, methyl, and ethyl groups.

17. The catalyst system of claim 1, wherein T* is silicon or germanium; each $R^a$ and $R^b$ is, independently, selected from the group consisting of halides, $C_1$ to $C_{20}$ substituted or unsubstituted hydrocarbyl groups, and cyclic structures where $R^a$ and $R^b$ form a heterocyclopentyl, heterocyclobutyl, or heterocyclohexyl structure with T being the heteroatom; and each $R^7$, $R^8$, $R^9$ $R^{10}$, $R^{11}$, $R^{12}$, $R^{13}$, $R^{14}$, and $R^{15}$ is, independently, hydrogen or a $C_1$ to $C_{20}$ substituted or unsubstituted hydrocarbyl group.

18. The catalyst system of claim 1, wherein the support is silica.

19. The catalyst system of claim 1, further comprising an activator.

20. The catalyst system of claim 19, wherein the activator comprises aluminoxane, a non-coordinating anion activator, or a compound represented by the formula:

$$(Z)_d^+(A^{d-})$$

wherein Z is (L-H), L is an neutral Lewis base; H is hydrogen; (L-H)$^+$ is a Bronsted acid; $A^{d-}$ is a non-coordinating anion having the charge d-; and d is an integer from 1 to 3.

21. A process to polymerize olefins comprising contacting one or more olefin monomers with the catalyst system of claim 1 and an activator.

* * * * *